United States Patent
Graf et al.

(10) Patent No.: US 7,118,068 B2
(45) Date of Patent: Oct. 10, 2006

(54) LOWERABLE LUGGAGE COMPARTMENT WITH A REAR FORCE SUPPORTING DEVICE

(75) Inventors: Oleg Graf, Burgrieden (DE); Ralf Poberschnigg, Zirndorf (DE)

(73) Assignee: Aircabin GmbH, (DE)

( * ) Notice: Subject to any disclaimer, the term of this patent is extended or adjusted under 35 U.S.C. 154(b) by 0 days.

(21) Appl. No.: 10/514,405

(22) PCT Filed: May 19, 2003

(86) PCT No.: PCT/EP03/05249

§ 371 (c)(1),
(2), (4) Date: Nov. 15, 2004

(87) PCT Pub. No.: WO03/097455

PCT Pub. Date: Nov. 27, 2003

(65) Prior Publication Data

US 2005/0224643 A1 Oct. 13, 2005

(30) Foreign Application Priority Data

May 17, 2002 (DE) ................................ 102 22 124

(51) Int. Cl.
*B64D 11/00* (2006.01)
(52) U.S. Cl. ................... 244/118.5; 312/245; 248/284.1
(58) Field of Classification Search ............. 244/118.1, 244/118.5; 312/245–248; 248/284.1
See application file for complete search history.

(56) References Cited

U.S. PATENT DOCUMENTS

| 4,076,351 | A | * | 2/1978 | Wyant | 312/247 |
| 5,058,846 | A | * | 10/1991 | Close | 248/284.1 |
| 5,456,529 | A | * | 10/1995 | Cheung | 312/245 |
| 5,934,615 | A | * | 8/1999 | Treichler et al. | 244/118.5 |
| 6,357,842 | B1 | | 3/2002 | Nott et al. | |
| 6,484,969 | B1 | * | 11/2002 | Sprenger et al. | 244/118.5 |
| 6,691,951 | B1 | * | 2/2004 | Frazier | 244/118.1 |

FOREIGN PATENT DOCUMENTS

| DE | 4130644 C2 | 3/1993 |
| DE | 4335151 C2 | 4/1995 |

(Continued)

OTHER PUBLICATIONS

Forms PCT/ISA/210, 220 International Search Report for PCT/EP03/05249.

*Primary Examiner*—Galen Barefoot
(74) *Attorney, Agent, or Firm*—Wood, Herron & Evans, L.L.P.

(57) ABSTRACT

A lowerable luggage compartment (10); in particular for a passenger aircraft, comprises a force assistance device (12) disposed behind the back of the luggage compartment (10) for providing an assistance force during opening and/or closing of the luggage compartment (10). The force provided by the force assistance device (12) is transmitted by means of a flexible force-transmitting device (cable 14) to the luggage compartment (10). The force assistance device (12) is the sole force assistance device acting upon the luggage compartment (10). In order to be able to enlarge the useful volume of the luggage compartment (10) without increasing its external dimensions and in order to combine improved maintainability with weight saving, the force assistance device takes the form of a force assistance module (12) with its own housing (24), in which a spring system generates the assistance force, and the force provided by the force assistance device is transmitted by means of a single flexible force-transmitting device to the luggage compartment (10).

9 Claims, 4 Drawing Sheets

FOREIGN PATENT DOCUMENTS

Figure 1:
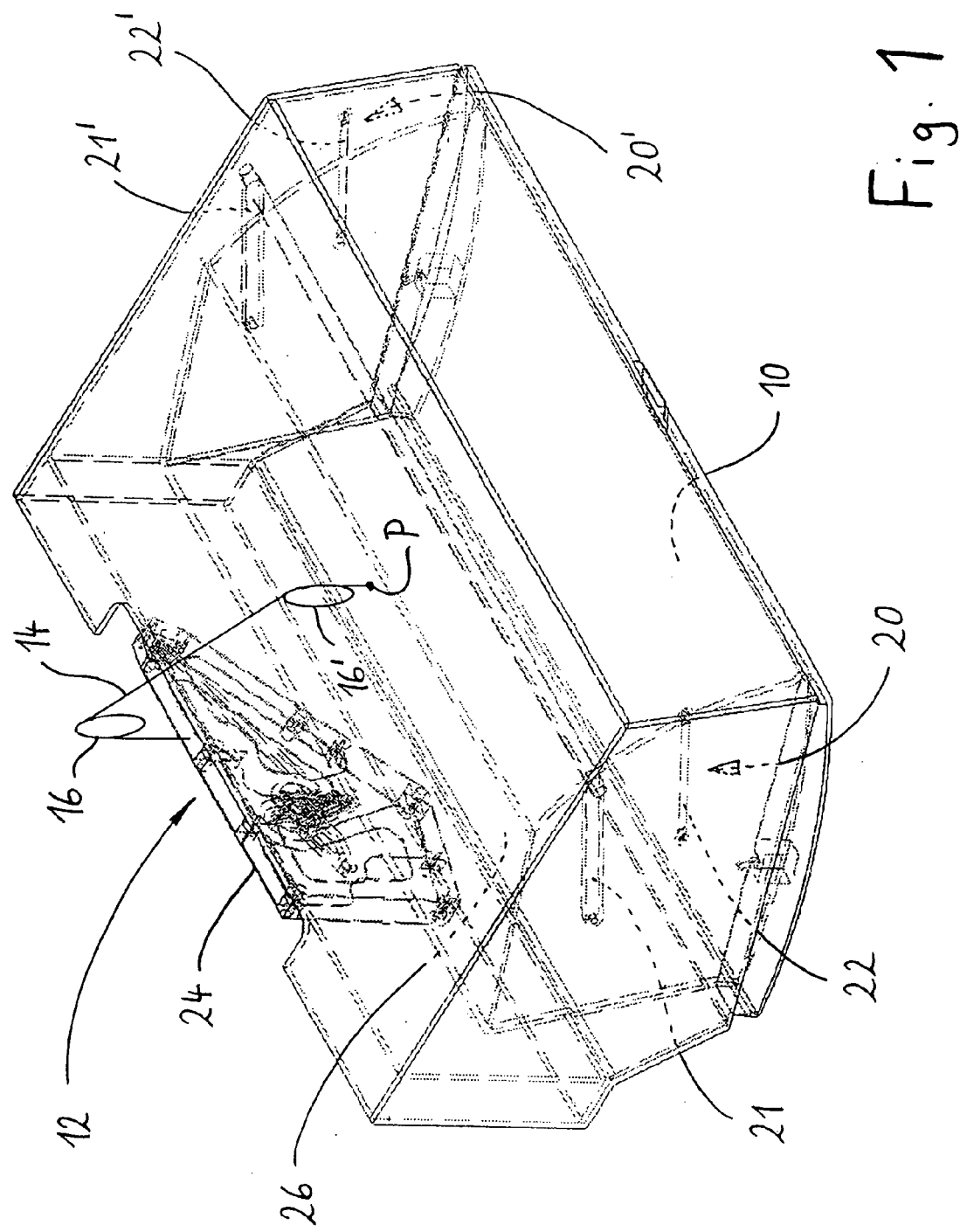

| | | |
|---|---|---|
| DE | 69422425 T2 | 7/1995 |
| DE | 4446772 C1 | 5/1996 |
| DE | 19617657 A1 | 11/1997 |
| DE | 19800588 A1 | 7/1999 |

* cited by examiner

LOWERABLE LUGGAGE COMPARTMENT WITH A REAR FORCE SUPPORTING DEVICE

The present invention relates to a lowerable luggage compartment, in particular for a passenger aircraft, having a force assistance device for providing an assistance force during opening and/or closing of the luggage compartment.

Lowerable overhead luggage compartments in aircraft are known. DE 41 30 644 C2, for example, describes a lowerable overhead luggage compartment of a passenger aircraft comprising guide systems in the form of four-bar mechanisms at each side wall of the luggage compartment and comprising a pneumatic pressure spring for each guide system, which spring in accordance with the weight of the luggage compartment supplies an assistance force for upward swiveling of the luggage compartment. An adjusting device during loading detects the weight of the luggage compartment and acts via an adjusting connection upon the force application point of the pneumatic pressure spring in order to achieve a setting corresponding to the respective loaded weight of the luggage compartment.

From DE 43 35 151 C2 a lowerable overhead luggage compartment is known, which likewise comprises at each of its two side walls a guide system with an associated pneumatic spring. The pneumatic spring is workingly connected to an assistance device, which for upward swiveling of the luggage compartment provides an assistance force adapted to the weight of the luggage compartment. A blocking device enables a latching of the assistance device.

Finally, DE 44 46 772 C1 describes an apparatus for guiding a lowerable overhead luggage compartment comprising two four-bar mechanisms disposed at both sides on the side walls of the luggage compartment as well as one spring system per four-bar mechanism for assisting the upward swiveling motion of the luggage compartment. A weighing plate disposed inside the luggage compartment acts upon pressure sensors, which are disposed below the weighing plate and are in turn connected by at least one adjusting connection to an adjusting cylinder, which acts upon an adjusting device for displacing the force application point of the spring system in order to displace the force application point as a function of the weight of the luggage compartment, thereby supplying an adapted opposing torque to the load moment resulting from the weight of the luggage compartment.

The underlying object of the invention is to improve a lowerable luggage compartment with a force assistance device in such a way that the useful volume of the luggage compartment is enlarged and that the unit consisting of luggage compartment and force assistance device has improved maintainability and weighs less than before.

Proceeding from the background art according to DE-T-694 22 425, this object is achieved according to the invention in that the force assistance device takes the form of a force assistance module with its own housing, in which a spring system generates the assistance force, and that the force provided by the force assistance device is transmitted by means of a single flexible force-transmitting device to the luggage compartment.

The solution according to the invention is notable for the fact that only a single force assistance device uncoupled from the guide of the luggage compartment is disposed at the back of the luggage compartment and that the force assistance device in the form of a force assistance module with its own housing may be used in combination with various types of luggage compartment and moreover, in the event of failure, as a unit is easily exchangeable and therefore very easy to maintain. By virtue of the only one flexible force-transmitting device, the gap between laterally mutually adjoining luggage compartments may be made narrower. The internal volume of a luggage compartment may therefore be enlarged without increasing its external dimensions. The solution according to the invention is moreover far less vulnerable to asymmetrical loading of the luggage compartment. Furthermore, the solution according to the invention saves weight and is more economical because all of the components of the force assistance device are required only singly and not in duplicate.

In the force assistance module, a pneumatic pressure spring preferably generates the requisite assistance force.

In the case of the luggage compartment according to the invention, the force provided by the force assistance device is transmitted by means of a single flexible force-transmitting device to the luggage compartment. The flexible force-transmitting device advantageously acts on or close to the upper side of the luggage compartment. The flexible force-transmitting device may act on only one point of the luggage compartment or alternatively on a plurality of points. Preferably, the flexible force-transmitting device is designed in such a way that it has at least one force application point on the luggage compartment that lies, in relation to the width extension of the luggage compartment, at least in the vicinity of the middle. Preferably, moreover, the force application point or the force application points are so selected that they are disposed on or close to a front edge of the upper side of the luggage compartment. This is advantageous particularly when there is only one force application point on the luggage compartment because an arrangement on or close to the front edge of the luggage compartment results in advantageous leverages. Alternatively, given a plurality of force application points, these may be positioned in such a way that one of them, preferably the middle force application point, is situated on or close to the front edge of the upper side of the luggage compartment, while, for example, a left and a right additional force application point are situated close to or on the associated side edges of the luggage compartment.

Any force-transmitting means that is flexible at least in one plane is suitable as a flexible force-transmitting device. In an embodiment of the luggage compartment according to the invention, the flexible force-transmitting device is a cable extending via at least one guide pulley. The cable may be a cable manufactured e.g. from stainless steel, but alternatively, especially in order to save more weight, may be a suitable plastic cable or a cable made of another material suitable for the described application.

In another embodiment, the flexible force-transmitting device is a chain, which is deflected at least once. In yet another embodiment, the flexible force-transmitting device is a Bowden cable. Owing to the cover, in which a Bowden cable extends, in the last-mentioned embodiment no separate deflection is required, rather the Bowden cable may be run directly from the force-transmitting device to the desired force application point on the luggage compartment.

The force assistance device may be fastened in principle to any desired location behind the back of the luggage compartment. In preferred embodiments of the lowerable luggage compartment according to the invention, the force assistance device is fastened to a housing, in which the luggage compartment is guided. In a passenger aircraft, this housing is connected to the supporting structure of the aircraft.

In particularly preferred developments of the lowerable luggage compartment according to the invention, the force assistance device is fashioned in such a way that the assistance force varies as a function of the loaded weight of the luggage compartment. Thus, irrespective of the loaded state of the luggage compartment, a user of the luggage compartment has to expend an always substantially identical force in order to close the luggage compartment.

Figure 2:
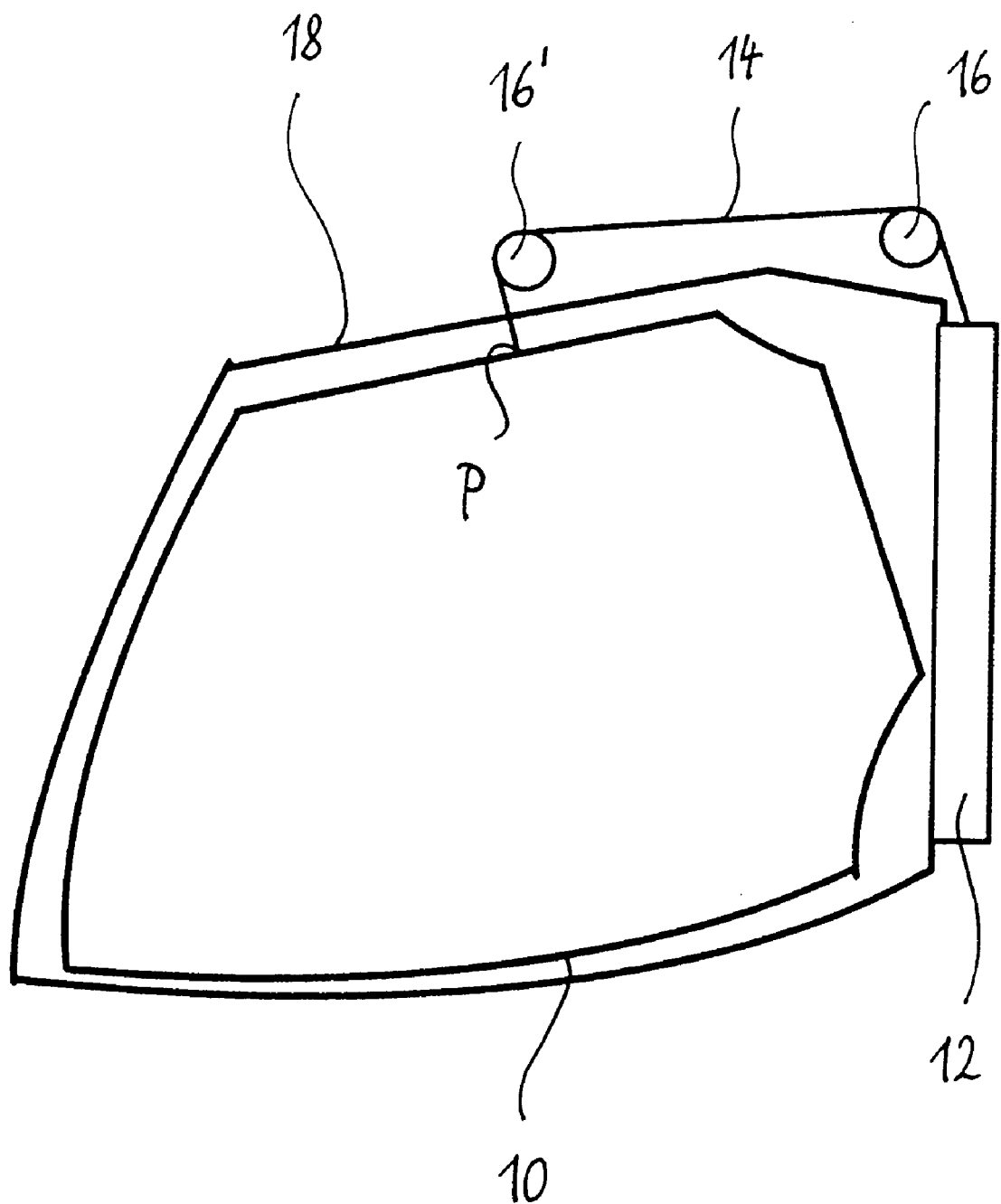
Figure 3:
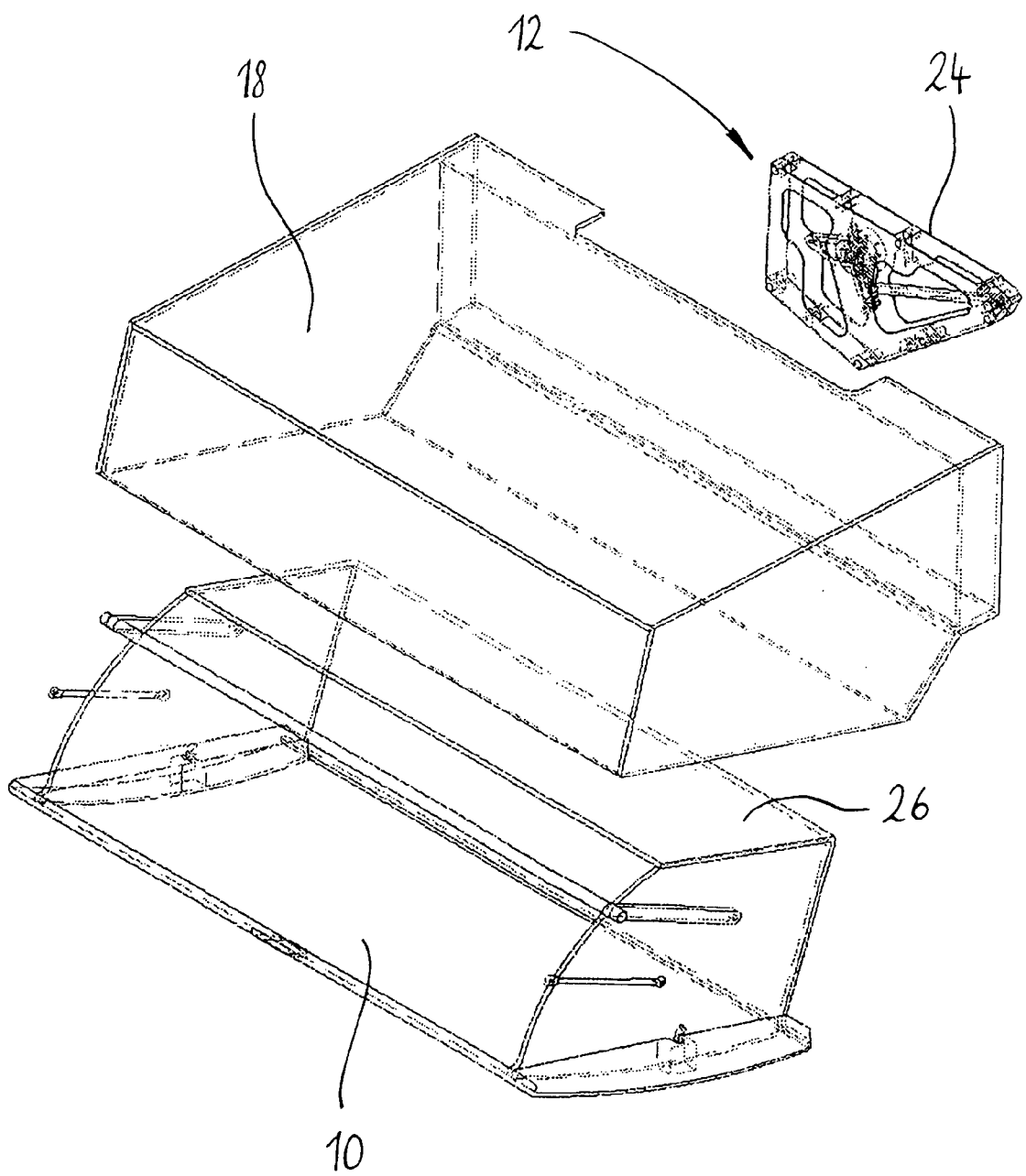
Figure 4:
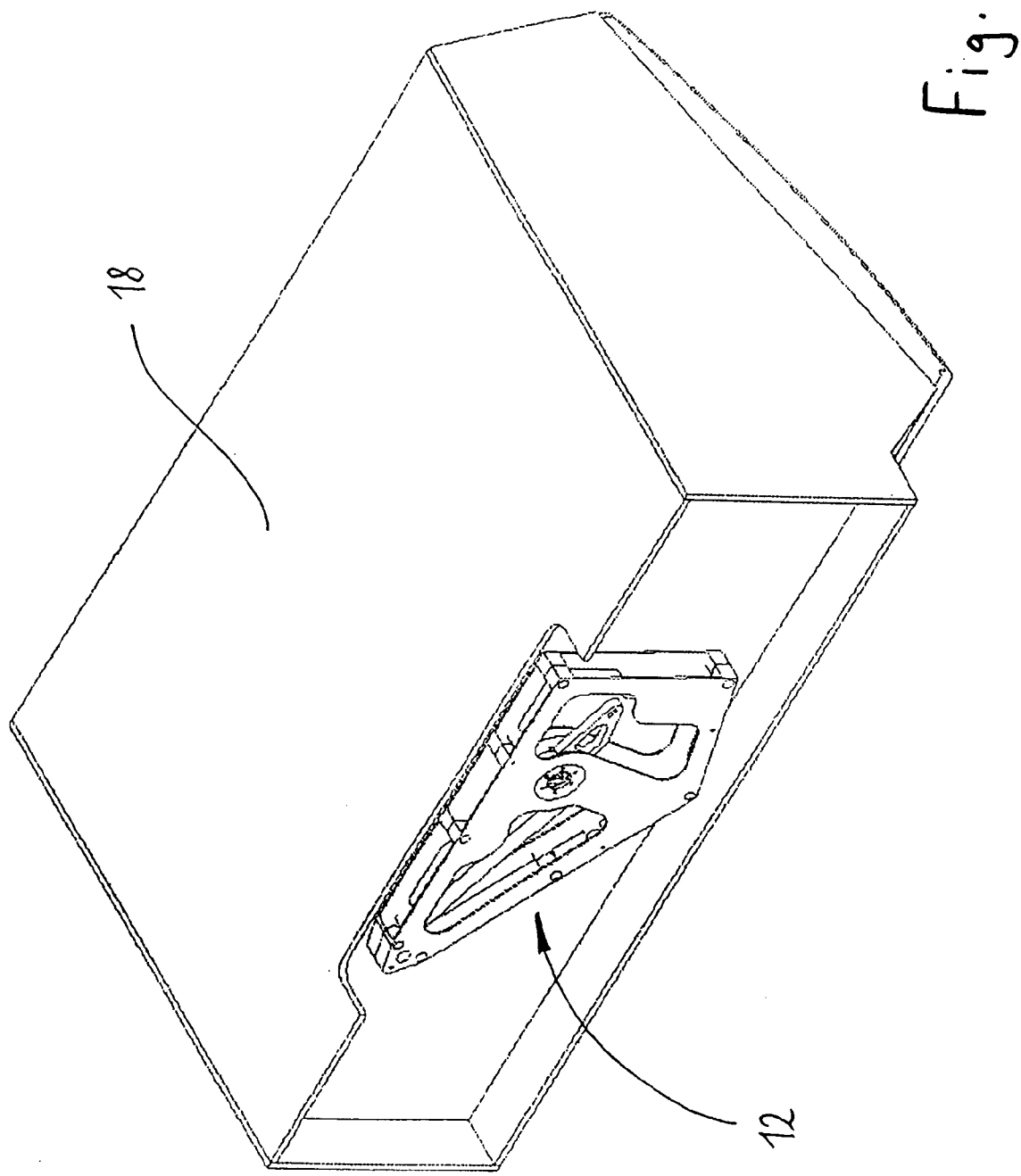

A preferred embodiment of a lowerable luggage compartment according to the invention is described in detail below with reference to the accompanying diagrammatic drawings. The drawings show:

FIG. 1 a lowerable overhead aircraft luggage compartment according to the invention, which is provided with a force assistance device, which is mounted behind the back of the luggage compartment and the assistance force of which is transmitted by means of a cable to the luggage compartment, FIG. 2 a broken-open, diagrammatic side view of the luggage compartment of FIG. 1, FIG. 3 an exploded, perspective view of the luggage compartment of FIG. 1 without the force-transmitting device in the form of the cable, and FIG. 4 a perspective rear view of the luggage compartment of FIG. 1 showing the integration of the force assistance device into a housing of the luggage compartment.

FIG. 1 shows a lowerable overhead luggage compartment, generally denoted by 10, of an aircraft, which is not further illustrated. Behind the back of the luggage compartment 10 a force assistance device in the form of a force assistance module 12 is mounted, which by means of a cable 14 serving as a flexible force-transmitting device transmits an assistance force to the luggage compartment 10 in order to keep the force needed to open and close the luggage compartment 10 to a low level, irrespective of whether the luggage compartment 10 is empty or fully loaded. The cable 14 is fastened by its one end in the force assistance module 12 and by its other end to the luggage compartment 10 and extends via two guide pulleys 16, 16', which are merely indicated here.

As may be seen more clearly from FIGS. 2 and 3, the luggage compartment 10 is accommodated in a housing 18, which in a manner not shown in detail is fastened to the supporting structure of the aircraft. The luggage compartment 10 is guided in the housing 18 by means of two guide devices 20 and 20', which are disposed one on either side of the luggage compartment 10 and each comprise two levers 21, 22 and 21', 22' respectively, in such a way that the luggage compartment 10 during opening swivels downwards out of the housing 18 and is in said case simultaneously lowered.

As is evident in particular from FIGS. 3 and 4, the force assistance module 12 is fully let into a back wall of the housing 18. In the illustrated embodiment, the force assistance module 12 is disposed approximately in the middle of the back wall of the housing 18.

The force assistance module 12 is designed as a separately manipulable unit and has its own housing 24, in which all of the components needed to provide the requisite assistance force are accommodated. The force assistance module 12 is moreover capable of adapting the supplied assistance force to the loaded state of the luggage compartment 10 so that the closing force, which a user has to apply in order to push the luggage compartment 10 upwards and close it, is at least substantially always identical and independent of the loaded state.

In the illustrated embodiment, the cable 14 transmitting the assistance force to the luggage compartment 10 exits from the top of the force assistance module 12, then is deflected by means of the first guide pulley 16 in such a way that it runs substantially parallel to the upper side of the housing 18, and is then deflected by the second guide pulley 16' down towards the upper side 26 of the luggage compartment 10. The cable 14 is suitably fastened to a force application point P on the upper side 26 of the luggage compartment 10. In the embodiment illustrated in FIG. 1, the force application point P is disposed midway between the two sides of the luggage compartment 10 and close to a front edge 28 of the upper side 26 of the luggage compartment 10. Depending on the installation conditions of the luggage compartment 10, the force application point P may, however, alternatively be disposed remote from the front edge 28, e.g. approximately in the middle of the upper side 26 of the luggage compartment 10 as shown in FIG. 2.

Non-illustrated embodiments may have a plurality of force application points and, instead of the cable 14, other flexible force-transmitting devices may be used, such as chains or Bowden cables.

The invention claimed is:

1. Lowerable luggage compartment (10), in particular for a passenger aircraft, comprising a force assistance device disposed behind the back of the luggage compartment (10) for providing an assistance force during opening and/or closing of the luggage compartment (10), wherein the force assistance device is the sole force assistance device acting upon the luggage compartment (10), and wherein the force assistance device takes the form of a force assistance module (12) with its own housing (24), in the housing (24) of the force assistance module (12) a spring system generates the assistance force, and the force provided by the force assistance device is transmitted by means of a single flexible force-transmitting device to the luggage compartment (10).

2. Luggage compartment according to claim 1, characterized in that the force assistance device is fastened to a housing (18), in which the luggage compartment (10) is guided.

3. Luggage compartment according to claim 1, characterized in that the flexible force-transmitting device acts on or close to an upper side (26) of the luggage compartment (10).

4. Luggage compartment according to claim 3, characterized in that the flexible force-transmitting device acts, in relation to the width extension of the luggage compartment (10), at least approximately in the middle.

5. Luggage compartment according to claim 4, characterized in that the flexible force-transmitting device acts on or close to a front edge (28) of the upper side (26) of the luggage compartment (10).

6. Luggage compartment according to claim 1, characterized in that the flexible force-transmitting device is a cable (14) extending via at least one guide pulley (16).

7. Luggage compartment according to claim 1, characterized in that the flexible force-transmitting device is a chain, which is deflected at least once.

8. Luggage compartment according to claim 1, characterized in that the flexible force-transmitting device is a Bowden cable.

9. Luggage compartment according to claim 1, characterized in that the assistance force varies as a function of the loaded weight of the luggage compartment (10).

* * * * *